United States Patent [19]

Matsueda

[11] Patent Number: 4,906,144
[45] Date of Patent: Mar. 6, 1990

[54] ECCENTRIC ROTARY FEEDER AND PRESSURIZED PNEUMATIC CONVEYING SYSTEM

[75] Inventor: Yoshizumi Matsueda, Osaka, Japan

[73] Assignee: Sanko Air Plant, Ltd., Osaka, Japan

[21] Appl. No.: 267,390

[22] Filed: Nov. 4, 1988

[51] Int. Cl.[4] .............................................. B65G 53/46
[52] U.S. Cl. ...................................... 406/65; 414/219; 222/368
[58] Field of Search ................................... 406/62–65, 406/127, 66, 67, 68, 128; 222/368; 414/219, 158, 189, 325; 198/532, 550.1

[56] References Cited

U.S. PATENT DOCUMENTS

| | | | |
|---|---|---|---|
| 2,477,414 | 7/1949 | McBride | 406/65 |
| 2,489,925 | 11/1949 | Omwake | 406/62 |
| 3,993,227 | 11/1976 | Oettinger | 222/368 |
| 4,705,433 | 11/1987 | Brannstrom | 406/63 |

Primary Examiner—Joseph F. Peters, Jr.
Assistant Examiner—Anne Sartelle
Attorney, Agent, or Firm—Wall and Roehrig

[57] ABSTRACT

A rotary feeder having a cylindrical casing having an upper inlet port and a lower outlet port in the vertical direction and a rotor disposed within said cylindrical casing and having a center axis being made eccentric with respect to a horizontal rotor driving shaft supported pivotally on the cylindrical casing, the rotor having further a plurality of blades provided in such that each tip of said blades is able to be in contact with the inner peripheral surface of the cylindrical casing in the vicinity of said upper inlet port or lower outlet port by pressure differential between an upstream passage and a downstream passage.

9 Claims, 8 Drawing Sheets

ECCENTRIC ROTARY FEEDER AND PRESSURIZED PNEUMATIC CONVEYING SYSTEM

BACKGROUND OF THE INVENTION

The present invention relates to a rotary feeder system and in particular to a pressurized pneumatic conveying system capable of conveying a constant quality of powdered or granular materials continuously at low velocity and in dense phase using a high-pressure air source. More specifically, it relates to a pressurized pneumatic conveying system in which a conventional rotary feeder is used. A center axis of the rotor is made eccentric with respect to a rotor driving shaft which is pivotally supported in a cylindrical casing. The casing has upper and lower openings that permit the blade tips of the rotor to contact the inner circumferences of the casing adjacent the upper and lower openings by means of the differential in pressure that is established between the upper and lower passages. A compressor is used as the air source in the system. By reducing the friction between the pipe wall and the material being conveyed, a constant flow of material through the system can be realized. The material may be fines, composites or the like.

In general, low-velocity transfer in a pressurized pneumatic air conveying system for handling powdered or granular materials is defined as a system in which the conveyed quantity is small, the transfer generally takes place in the range of about 2 to 12 kg/m$^2$ of a mass flow rate of conveying air. The flow rate becomes smaller as the diameter of conveying pipe decreases. High velocity transfer is defined as a pneumatic conveying system which is a dilute phase conveying system mainly suitable for a medium distance transfer. This type of system usually employs a Roots blower or turbo-blower having a discharge air pressure of 1 kg/cm$^2$ or less as an air source and the transfer takes place at the mass flow rate of 12 kg/cm$^2$ or more.

In the aforesaid low-velocity conveying system, a compressor of about 5 to 7 kg/cm$^2$ normal pressure is widely used. Cellar-type or fluxo-type blow tanks, which are subject to pressure vessel regulations, are also needed to meet the requirements covering equipment for feeding and storing various granular materials.

Referring to the conventional low-velocity conveying system of FIG. 9, there is shown a configuration in which a twin-body cellar-type tank is employed. A powdered or granular material to be conveyed is charged into a feed hopper disposed at the top of the system. The material is introduced into the cellar-type blow tank (20b) under atmospheric pressure by opening and closing of a cone valve.

At this time, from a multi-phase feed pipe (22), connected to another blow tank (20a), the material is sent out in a lump or plug (hereinafter merely referred to as a plug) and conveyed slidably in a conveying line system (23) connected to the end of said feed pipe (22).

During this conveying process, a primary air nozzle (21) is connected to compressed air piping (26) which is in communication with the high-pressure air source together with a secondary air nozzle (24) and back pressure nozzle (25). The transfer is effected in a plug-flow fashion as the plugs move slidably in the pipe. At least three or more spaced nozzles, such as the primary, secondary and back pressure nozzles must be adjusted, one relative to the other, to effect the batch transfer.

However, feed volumes to the conveying line fluctuate, thereby causing plugs in the conveying line to break, and there is little that can be done to prevent this from happening.

In order to solve such problems in a batch switching system, it has been proposed to construct the blow tanks in two vertical stages which are connected in series to effect continuous feeding by switching upper and lower dampers.

In this construction, however, in addition to the unequal plug lengths and plug intervals, variations of the feed volume by forced feeding depend on the adjustment of compressed air flow so that it has a mass below one-thousandth of the feed volume. Since the feeding volume is not fixed mechanically, the fluctuations in the feeding volume are difficult to prevent.

Moreover, since the air-tight blow tanks are stacked in two stages and installed vertically as pressure vessels, the cost for filling the materials to be conveyed to the tank-top hopper is very expensive when compared to the twin-body type blow tanks.

Next, referring to a well-known configuration of a high-velocity conveying system shown in FIG. 10, powdered or granular materials are charged into a hopper (27) under atmospheric pressure and are discharged to a lower acceleration mixing chamber (29) from an outlet port at its lower end by rotation of a low-pressure rotary feeder (28). The material is then conveyed in a fixed amount to a cyclone separator and a storing silo continuously through a conveying line (23).

In this case, a turbo-blower or roots blower having a capacity of about 0.3 to 1.0 kg/cm$^2$ is generally used. Atmospheric pressure is found on both the charging side and discharging side of such conventional type low-pressure rotary feeder (28) and the differential pressure depends largely on characteristic differences of powdered or granular materials to be conveyed. It is usually below 0.7 atm and the air source pressure can be supplied at 0.5 to 1.5 kg/cm$^2$ as the limit, thereby the controlled mass transfer can be secured.

The present rotary feeder has a simple construction in which a rotor is supported in a casing, and a constant supply of granular material is handled in an air-tight manner by simply intercepting upper and lower passages having the required pressure differential outside the casing. Since any fixed amount of material can be supplied by adjusting the speed of the rotor, the system is widely used for supplying powdered or granular materials to the conveying system and for mixing the same therein.

Generally, a small clearance between the rotor and casing is preferred since the rotary feeder is designed to intercept pressure of the conveying system and drop the powdered or granular materials by gravity. A suitable clearance is required therebetween for solving difficulties in manufacturing and assembling the casing and rotor, or operational difficulties caused by excessive rotational resistance attributable to intrusions of powdered or granular materials, thermal expansion of the rotor and so on.

Leakage of pressurized gas increases as the pressure differential between upper and lower portions of the casing become larger. The apparent specific gravity of the materials to be handled is reduced as the drop of materials to be handled decreases or diverges due to blowback of the leaked gas, resulting in inconstant feeding.

The limit of the pressure differential between the upper and lower passages outside the casing is usually below 0.7 atm. For example, in the case of materials to be handled whose apparent specific gravity is about 0.5 T/m$^3$, the practical limit is about 6000 to 7000 mm H$_2$O, and about 3000 to 4000 mm H$_2$O and is thus unsuitable for use in a long-distance high-pressure conveying system.

In order to reduce the clearance between the casing and rotor, it is proposed to coat the rotor tips with fluororesin to reduce rotational resistance, or to embed the tips with carbon chips and protrude them outward by means of springs.

However, in the aforesaid construction, problems are encountered in abrasive resistance and reliability, thus the rotary feeder is still deemed to be unsuitable for use in long-distance high-pressure conveying system.

While recently in the pneumatic transfer of finely powdered or granular materials such as composite materials whose surfaces are activated, higher conveying pressures are demanded to attain higher pneumatic conveying efficiency.

OBJECTS AND SUMMARY OF THE INVENTION

It is an object of the present invention to provide a rotary feeder capable of realizing a conveying method using higher conveying pressures in pneumatically conveying powdered or granular materials.

It is another object of the present invention to provide a low-velocity dense phase pneumatic conveying system at low installation and operation costs, wherein characteristic deteriorations such as crushes, abrasives and quality deteriorations are prevented when conveying various powdered and granular materials such as composite materials made of fine or ultra fine particles or are processed by surface activation.

It is a further object of the present invention to provide a high-pressure pneumatic conveying system capable of feeding a fixed quantity of material continuously under stable pneumatic transfer conditions when short-distance low velocity dense phase and long-distance high-velocity dilute phase transfers are effected with a compressor as an air supplying source.

As a result of various studies made with respect to improvements in a rotary feeder itself to realize a conveying method in which a higher air pressure source can be used in pneumatic conveying of powdered or granular materials using a rotary feeder, it has been found that by eccentrically supporting a rotor shaft pivotally on a casing, the rotor can be moved responsive to pressure differences between the feeding and conveying lines. When the conveying line is at a high pressure, the rotor is moved toward the upper inlet port to bring the clearance with the casing to a minimum. At this time, the powdered or granular material serves as a lubricant to some extent to obtain a smooth rotation, so that leakage attributable to the pressure differential can be prevented and the powdered or granular material can be conveyed at a higher air pressure source than in a more conventional method.

Furthermore, as a result of studies made on optimum conditions in using the rotary feeder in a pressurized pneumatic conveying system, it has been found that a low velocity dense phase pneumatic conveying can be realized. The present invention was accomplished by disposing a hopper and a multi-phase feed pipe provided with a blow nozzle on upper and lower openings of the rotary feeder, using a compressor capable of supplying compressed air of 1.0 kg/cm$^2$ or more as a compressed air source, and communicating a rotor chamber filled with powdered or granular material with the return side rotor chamber of reverse rotation in the casing to admit return side rotor chamber pressure into the rotor chamber filled with the powdered or granular material.

The present invention is directed to a rotary feeder incorporating a rotor whose shaft is pivotally supported horizontally and eccentrically on a cylindrical casing having vertically disposed upper and lower openings. The blade tips on the rotor are able to contact the inner circumferences of the casing adjacent the upper inlet port and lower outlet port by pressure difference between the upstream and downstream passages. The pressurized pneumatic conveying system includes a hopper connected to the inlet port of the rotary feeder that is opened to low pressure or atmospheric pressure, a chute cylinder connected further thereto, a drop cylinder connected to the outlet port of the rotary feeder, a multi-phase feed pipe provided with a blow nozzle and a conveying pipe connected to its end to form a pipe line. The system is characterized by disposing communicating passages in the casing for admitting return side rotary chamber pressure into the rotary chamber filled with powdered or granular material, and by connecting the compressor to the blow nozzle and delivering compressed air at 1.0 kg/cm$^2$ or more.

DETAILED DESCRIPTION OF THE PREFERRED EMBODIMENT

A pneumatic conveying system according to the present invention includes a hopper opened to the atmosphere and filled with a powdered or granular material to be conveyed, a multiphase feed pipe which is in communication with an inlet port on the upper end face of a high-pressure oriented specific rotary feeder and a blow nozzle communicating with a compressor and inserted at a required angle in the feed pipe, and connected to a conveying line at its downstream end. Accordingly, proper plugs of constant length are formed at constant intervals to accomplish continuous pneumatic conveying regularly.

The rotary feeder of the present invention has a rotor that is incorporated in the casing horizontally and eccentrically in order to increase a so-called back differential pressure.

As a means for incorporating the rotor in the casing horizontally and eccentrically, suitable well-known configurations capable of transmitting rotation may be selected and the rotor may be incorporated eccentrically such that the rotor is made eccentric in a free fashion with respect to a driving shaft supported pivotally in the casing. Alternatively, the rotor shaft may be supported pivotally and eccentrically with respect to the casing, or a joint supplied through with the rotor shaft and a driving shaft supported pivotally in the casing are made eccentric or through use of a flexible joint formed by a resilient member or the like.

In the rotary feeder shown in FIG. 2, as to be described later in detail, the rotor is made eccentric in a free fashion with respect to the driving shaft that is supported pivotally in the casing.

Figure 3A:
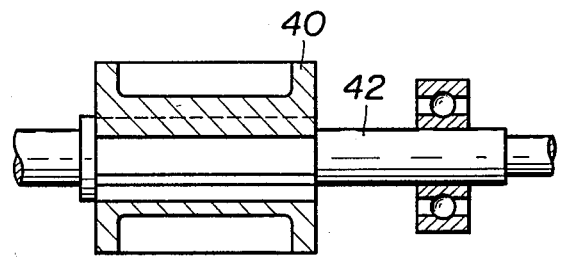
FIGS. 3a and 3b are front and side views of a rotor of a rotary feeder according to the present invention.
Figure 3B:
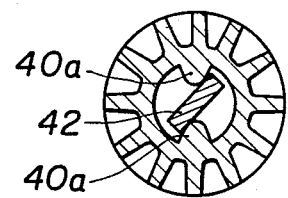

In an example shown in FIG. 3, the rotor (40) is provided with an engaging hole that is larger than the outside diameter of the driving shaft (42) and is engaged freely to the rotary shaft (42) having a plate-shape center portion, and rotated by engagement between protrusions or protruded rails (40a) disposed on the inner circumference thereof. The driving shaft (42) is of a given shape for the possible rotational transmission.

Figure 4:
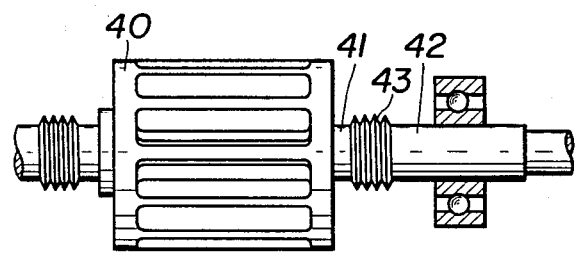
FIG. 4 is a front view of the rotor.

In an example shown in FIG. 4, a flexible joint (43) is provided between the rotor shaft (41) and the driving shaft (42) supported pivotally in the casing.

Although not shown, a mechanical engaging portion may be located between the rotor and transmission shafts which engages the plate-shape end of the rotary shaft freely and eccentrically to another rotary shaft provided with mating grooves.

Figure 5A:
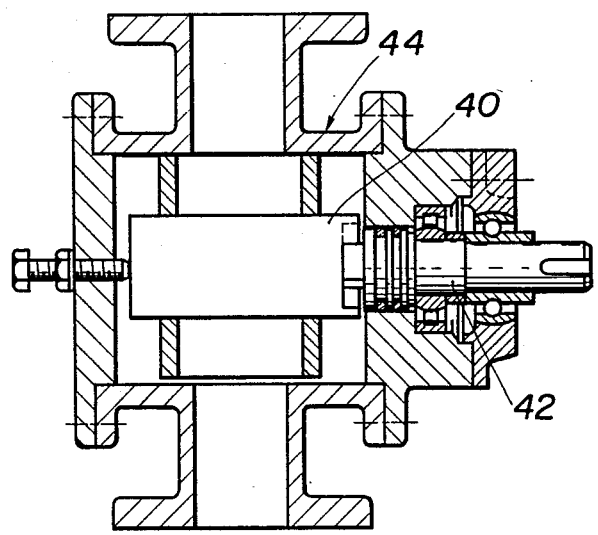
FIGS. 5a and 5b are a longitudinal sectional front view and a side view of a rotary feeder according to the present invention.
Figure 5B:
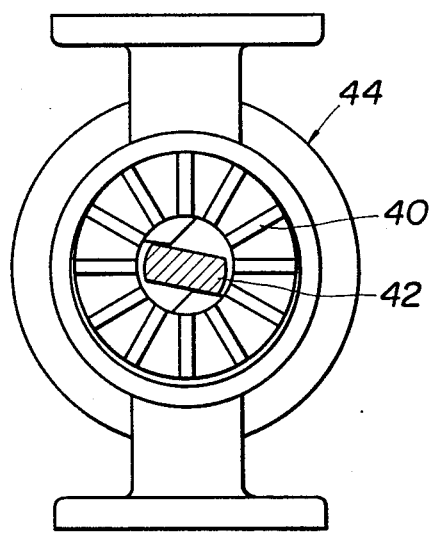

Furthermore, the rotor may be incorporated eccentrically such that only one end of the shaft is supported without supporting the opposite ends as shown in FIG. 5.

Figure 6A:
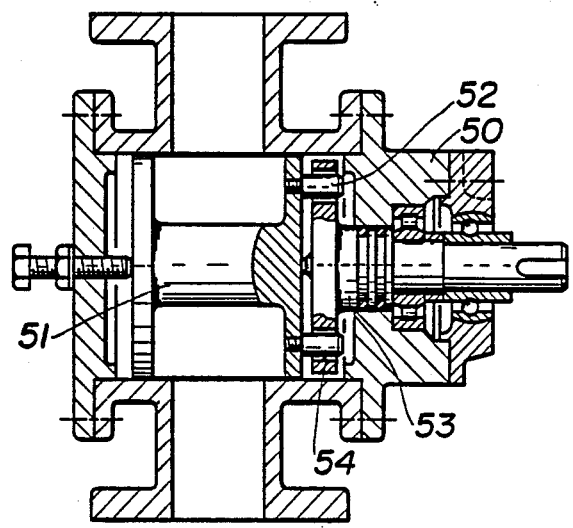
FIGS. 6a, 6b, 7a, and 7b are longitudinal sectional front views of a rotary feeder showing the arrangement of an engaging pin according to the present invention.
Figure 6B:
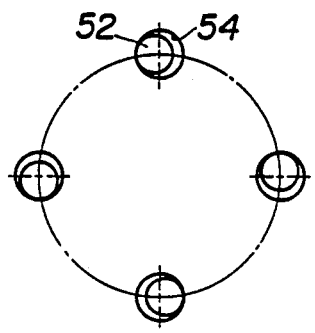
Figure 7A:
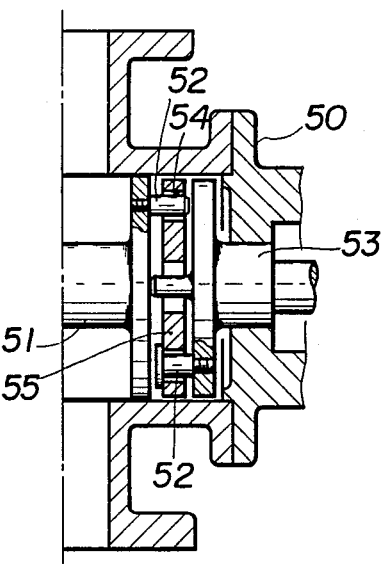
Figure 7B:
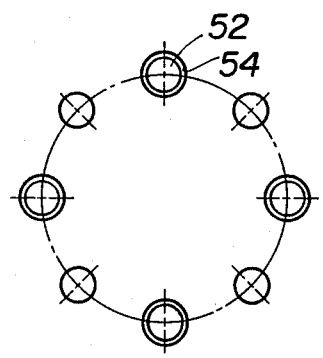

In examples shown in FIGS. 6 and 7, a plurality of pins supported rotatably on one side of the rotor are engaged freely by pin-holes to provide eccentricity between the rotor shaft and the driving shaft supported in the casing.

In the example shown in FIG. 6, a plurality of pins (52) are provided rotatably at constant intervals on the outer circumference on the end face of the rotor shaft (51), and are engaged freely in pin-holes (54) each having a diameter that is larger than the outside diameter of the pin (52). The holes are disposed at constant intervals on the outer circumference on the driving shaft end face (53) which is supported pivotally in the casing (50).

In the example shown in FIG. 7, a plurality of pins (52) are provided at constant intervals on outer circumferences of each end face of the rotor shaft (51) and driving shaft (53) supported on the casing (50). The pins are engaged freely in pin-holes (54) having a diameter larger than the outside diameter of the pin (52) that are disposed at constant intervals on the outer circumference of a disc (55) arranged rotatably between each end face of the rotor shaft (51) and the driving shaft (53).

Any type of rotor blade such as a so-called parallel type, helical type, double helical type and so on may be suitably selected which is responsive to powdered or granular materials, and the number of blades may similarly be selected suitably for the purpose of continuously feeding a constant quantity of material.

Shapes of the inlet port may be selected suitably responsive to the powdered or granular materials and the port may be totally opened or inclined against the rotary shaft.

Moreover, the present invention is characterized by admitting the rotor chamber pressure on the return side into a rotor chamber that is filled with powdered or granular materials. Specifically, this can be accomplished by disposing conduits communicating with the rotor chamber filled with powdered or granular materials with the return side rotor chamber of reverse rotation in the casing.

Furthermore, a pipe line through which compressed air is introduced from a compressor may be installed to prevent blocking of the aforesaid conduits by powdered or granular materials.

Figure 1:
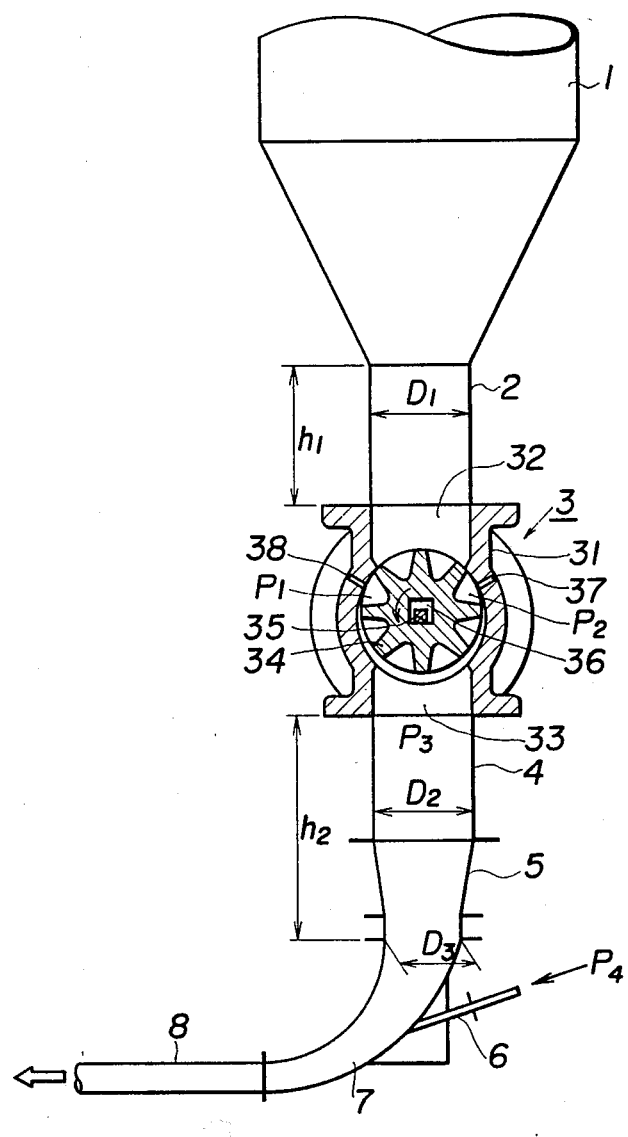
FIG. 1 is a longitudinal sectional view of a pressurized pneumatic conveying system according to the present invention.

In the present invention, as shown in FIG. 1, a chute pipe (2) and drop pipe (4) are connected respectively to an inlet port (32) and an output port (33) of casing (31) of the rotary feeder. The chute cylinder (2) is connected to the inlet port (32) and produces the material sealing effect. The drop cylinder (4) provides a stirring and mixing effect for allowing the constant mass discharge from the rotary feeder (3).

Assuming that the inside diameter of the chute cylinder (2) is $D_1$, cylinder height is $h_1$, the inside diameter of the drop cylinder is $D_2$, height including a differential diameter pipe (5) disposed between the drop cylinder (4) and multi-phase feed pipe (7) is $h_2$, the upstream inlet end face diameter of the multi-phase feed pipe (7) is $D_3$ and the downstream outlet end face diameter is $D_4$. The inside diameter $D_1$ of the chute cylinder (2) is preferably equivalent to or not larger than the inlet port (32) cross section area of the rotary feeder and $h_1$ is between $0.5 \times D_1$ and $1.5 \times D_1$.

As to the drop cylinder (4), $D_2$ is preferably generally equal to or not smaller than the inlet port (32) cross section area of the rotary feeder and $h_2$ is between $1 \times D_2$ and $3 \times D_2$.

For the multi-phase feed pipe (7), $D_3 \leq D_2$, $D_3 \geq 1.5 \times D_4$ and $D_4$ is preferably equal to the pipe diameter of conveying line (8).

In order to realize a low-velocity dense phase pneumatic transport, high-pressure air from a compressor of $1.0 \ kg/cm^2$ or more is required as the compressed air injected from the blow nozzle is preferably above $1.5 \ kg/cm^2$ and more preferably, above $2.0 \ kg/cm^2$.

Next, assuming that pressure in the hopper (1) is $P_0$, pressures in the rotary chamber filled with material to be handled and the return side rotary chamber of reverse rotation in the casing (31) are respectively $P_1$ and $P_2$. The upper internal pressure of the drop cylinder (4) is $P_3$ and high-pressure air source pressure of the blow nozzle (6) is $P_4$. The pressures at each portion of the system during the ordinary operation must be balanced at $P_0 < P_1 \leq P_2 \leq P_3 \leq P_4$ for effecting the regular pneumatic transfer with continuous and constant mass supply under the aforesaid back differential pressure.

In the present invention, since a rotor is disposed eccentrically with respect to the housing, the rotor is moved by a predetermined pressure difference between the upstream inlet line and the outlet conveying line, and is rotated in the contacting or near contacting condition with respect to the upper inlet port. Namely, the clearances of the rotor blade tips are close to zero, thus preventing pressure leakage in this area.

Moreover, in cooperation with the material sealing effect in the chute cylinder, mixing and stirring effect in the drop cylinder for allowing for a constant mass discharge forms proper plugs of constant length at constant intervals in the multi-phase feed pipe. This continuous and constant mass feeding and transfer is made possible at a low-velocity dense phase transfer by using a compressor as an air supplying source.

In recent years, processes for handling various new fine materials and composite materials, for purposes of preventing breaking, deterioration, degradation of uniformity and contamination of particles have been in demand. The dense phase pneumatic conveying system of the present invention aims at minimizing frictional contacts between the particles and pipe walls by conveying materials at a slower velocity.

One example of a pneumatic conveying system according to the present invention will be explained with reference to FIG. 1.

Materials to be conveyed are charged into a storage container such as a hopper (1) which is reduced conically at its lower portion. A chute cylinder (2) is connected to its lower opening and is further connected to an upper inlet port (32) of casing (31) of a high-pressure type rotary feeder (3) and to an outlet port (33) on the lower end face of which a drop cylinder (4) is also connected.

Powdered or granular materials are dropped from above and are formed into a solid-air multi-phase flow or a plug flow by air jets from a compressor (not shown). The material is introduced into a conveying line (8) by a multi-phase feed pipe (7) which is connected to the drop cylinder (4) through a differential diameter pipe (5) whose diameter reduces gradually.

The multi-phase feed pipe (7) is curved normally and its downstream end face is reduced to the same diameter as the inlet end of the conveying line (8) and connected thereto. A blow nozzle (6) is inserted adjacent the curved point and is designed to inject compressed air from the compressor in a jet stream toward the inlet end of the conveying line (8).

The materials to be conveyed, which are stored in the hopper (1), are dropped into and fill the chute pipe (2) connected to its lower end.

Figure 2A:
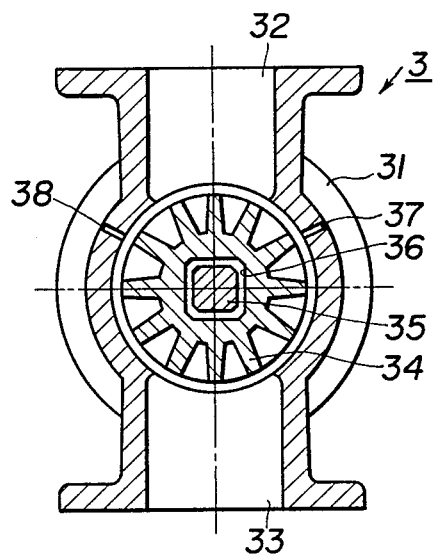
FIGS. 2a and 2b are longitudinal sectional views of essential portions of the same system.

The high-pressure type rotary feeder (3) is a mechanism having a quite different design concept when compared to a conventional low-pressure shown in FIG. 2. The inner cylinder surfaces of the casing (31) are formed into an oval section which is perpendicular to the vertical axis. The rotating rotor (34) has its blade tips cut circularly and its diameter is reduced to a size slightly smaller than the shorter axis of the oval section aforementioned.

Figure 2B:
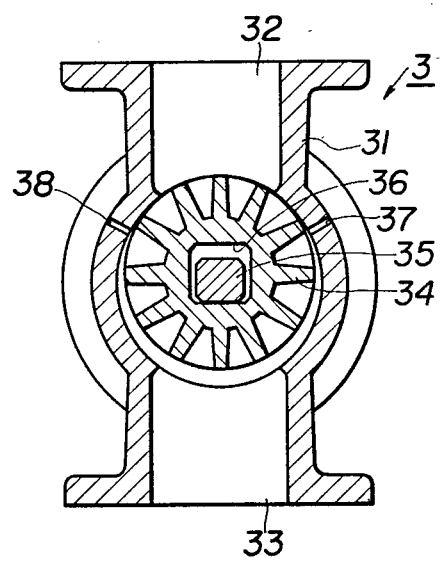

A shaft hole (36) in the rotor (34) is formed into a floating bearing construction wherein a driving shaft (35) is floated to rotate the rotor (34). In the case where the outlet port (33) pressure of the rotary feeder (3) is higher than the inlet port (32) pressure, as shown in FIG. 2b, the rotor (34) is lifted upward and rotated near the upper inner circumference close to lower side end of the inlet port (32).

The number of blades on the rotor (34) and the principal dimensions of the rotary feeder (3) must be designed and manufactured such that at least two blade tips of the rotor (34) rotate constantly in sliding contact with the inner circumference of the casing (31).

The casing (31) has communicating holes (37)(38) for disposing conduits which communicate with the rotor chamber filled with powdered or granular materials. The return side rotary chamber of reverse rotation in the casing is opened. The return side rotor chamber pressure is thus introduced into the rotor chamber filled with the powdered or granular materials.

It is desirable to reduce the amount of leakage under high back differential pressures of the rotary feeder (3). The particle sealing effect in the chute cylinder (2) disposed between the hopper (1) and rotary feeder (3) can be doubled. The amount of leakage between the blade tips of the rotor (34) and the inner surfaces of the casing has proven to be negligibly small regardless of high differential pressure conditions.

The drop cylinder (4) is connected to outlet port (33) of rotary feeder (3) and compressed air is injected into the multi-phase feed pipe (7) from the blow nozzle (6), while materials to be conveyed are formed into plugs and moved to the downstream side of the conveying line (8) forming air layers between the plugs that are being conveyed.

At this time, the compressed air is injected against the plug surface and a part of the injection energy flows back up to the drop cylinder (4). Pressure builds up in the drop cylinder (4) following the upward jet stream which serves to raise the rotor (34) and further acts as a motive power to prevent leakage while accelerating the stirring effect attributable to the entrained air flow in the drop cylinder (4). This produces a constant and stable supply of powdered or granular material from the outlet port (33) of the rotary feeder (3).

Figure 8:
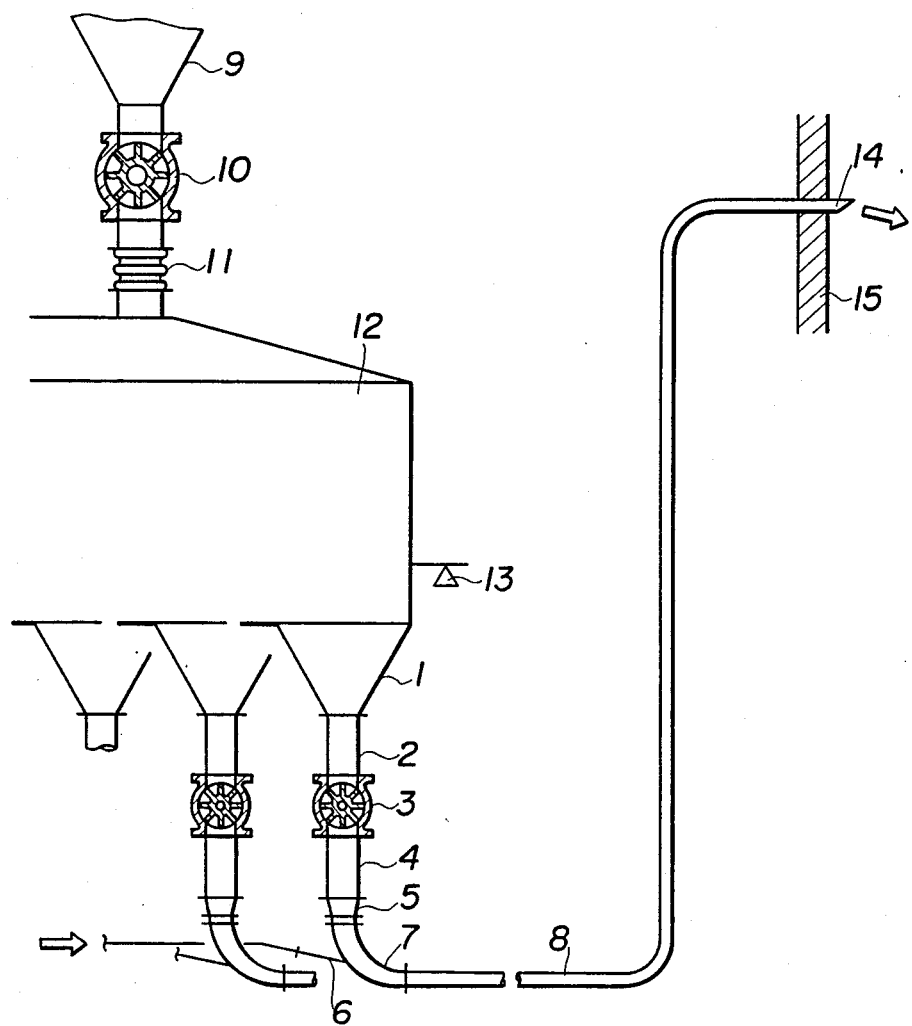
FIG. 8 is a schematic view of another embodiment of a pneumatic conveying system according to the present invention employed in a high-pressure combustion furnace.
Figure 9:
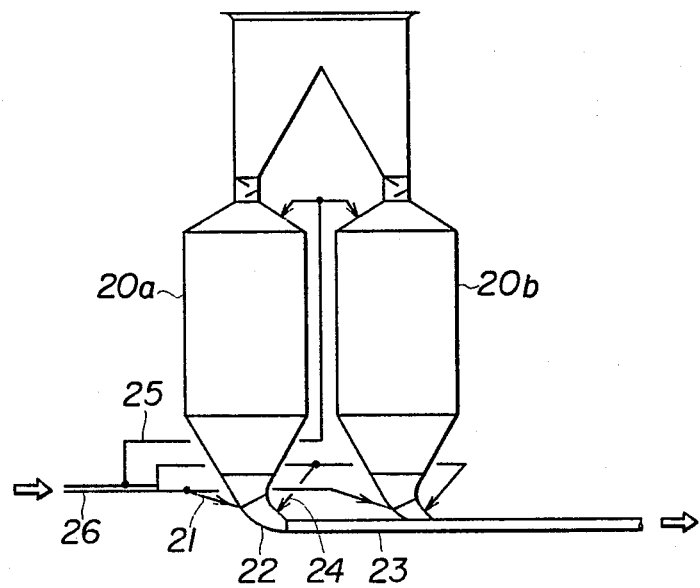
FIGS. 9 and 10 are schematic views of a conventional conveying system used in the prior art.
Figure 10:
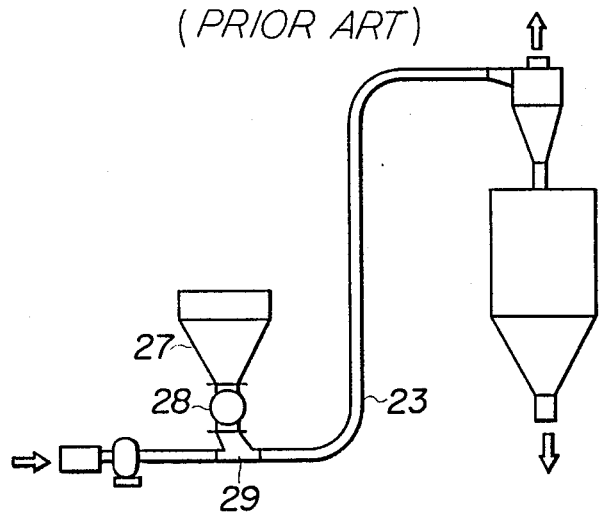

Another applicable embodiment of the present invention will be explained with reference to FIG. 8.

Here, a pneumatic conveying system supplies a uniform amount of pulverized coal to a high-pressure combustion chamber of a blast furnace through one or several combustion ports.

Pulverized coal is conveyed from reservoirs and charged into a silo or hopper (9). The coal is then supplied downward in a fixed flow by means of a conventional low-pressure type rotary feeder (10). The coal is discharged to a metering bin (12) that includes a suitable metering mechanism (13) which is connected to a flake pipe (11) for effecting metering of a desired quantity of material.

Under the metering bin (12) is a plurality of distributing hoppers (1a), chute cylinders (2), high-pressure type rotary feeders (3), drop cylinders (4) and multi-phase feed pipes (7) which are responsive to a number of combustion ports in the furnace to which the fuel coal is being conveyed.

Suitable devices are connected to a conveying line (8) installed exclusively and independently to supply a fixed amount of material continuously to combustion nozzles (14) provided in the high-pressure furnace (15). A predetermined amount of pulverized coal is thus injected continuously into the furnace for uniform combustion.

A high-velocity transfer above 25 to 30 m/s is preferable for injecting coal into the high-pressure furnace (15) to prevent back fires. Conventionally, a high-velocity dilute phase mass transfer is often used since a predetermined quantity of conveying fluids and oxygen are required. Pressure losses in the conveying line (8) are about 1 to 2 kg/cm$^2$, so that compressed air of about 3 to 7 kg/cm$^2$ is required. This is obtained by adding the line pressure loss to internal pressure of the furnace.

In the present invention, since a compressor capable of supplying the compressed air is used as the air supplying source for the rotary feeder, the high-pressure air can be supplied continuously at fixed quantity as a conveying energy source. Accordingly, various powdered or granular materials can be pneumatically conveyed under stable conditions.

In the present invention, the system can be built in a compact size, reducing installation and running costs considerably as shown in Table 1 when compared to the more conventional batch system.

Comparisons of Table 1 represent the case where nylon pellets of 3 mm×3 mm column shape particle diameter are conveyed for 150 m using the system of the present invention.

TABLE 1

|  | Complete Continuous Type (Present Invention) | Conventional Single-Body Type Blow Tank | Batch System Twin Body Type Blow Tank |
| --- | --- | --- | --- |
| Conveying Line Diameter Ratio | 1.0 | 2.0 | 1.5 |
| Conveying Air Volume Ratio | 1.0 | 4.0 | 2.2 |
| Conveying Power Ratio | 1.0 | 4.3 | 2.3 |
| Mixer Height Ratio | 1.0 | 2.4 | 2.4 |

What is claimed is:

1. A rotary feeder for conveying granular material that includes
   a casing having a horizontally disposed cylindrical opening therein,
   a vertically disposed upper inlet port in the casing for connecting the opening to a material supply hopper,
   a vertically disposed lower outlet port in the casing for discharging material from said casing,
   a floating rotor assembly rotatably contained in the casing opening said rotor assembly having radially extended blades for moving material from the inlet port to the outlet port,
   mounting means for supporting the rotor assembly in the casing so that the rotor assembly can move upwardly to place the blade tips in sliding contact against the wall of the casing opening on either side of the inlet port, and
   pressure means for producing a difference in pressure between the inlet and outlet ports such that the rotor assembly is moved upwardly toward the inlet port.

2. The rotary feeder of claim 1 wherein said mounting means further includes a drive shaft for turning the rotor assembly and an eccentric coupling for connecting the drive means to the rotor assembly whereby the rotor assembly can move upwardly in said casing.

3. The rotary feeder of claim 2 wherein the eccentric coupling includes a male member secured to one of said shafts that is contained in an oversized hole formed in the other of said shafts.

4. The rotary feeder of claim 1 wherein said rotor assembly further includes chambers between each of the blades for holding a gravity of material, said chambers being arranged to close in sealing contact against the wall of said casing opening to maintain a pressure difference between the inlet and the outlet ports.

5. The rotary feeder of claim 1 wherein said pressure forming means further includes a drop pipe secured to the outlet port, a differential pipe for connecting the drop pipe to a multi-phase feed pipe and a compressor means for introducing a high-pressure fluid into said pressure forming means.

6. The rotary feeder of claim 5 wherein the diameter of said differential pipe decreases from the drop pipe toward the multi-phase feed pipe.

7. The rotary feeder of claim 6 wherein the differential pipe has a curved section to turn a flow of material moving therethrough from a vertical to a horizontal position and further includes a blow nozzle for introducing a stream of compressed air into the curved section of said pipe.

8. The rotary feeder of claim 4 that further includes communicating passages formed in casing on either side of the inlet port that are connected so that the pressure in a chamber leaving the inlet port region is about equal to the pressure of a chamber entering the inlet port.

9. The rotary feeder of claim 2 wherein the eccentric coupling includes a series of spaced apart pins secured to one of said shafts that are received in oversized holes formed in a plate that is secured to the other of said shafts.

* * * * *